US009228540B2

(12) United States Patent
Yamamoto et al.

(10) Patent No.: US 9,228,540 B2
(45) Date of Patent: Jan. 5, 2016

(54) FUEL VAPOR PROCESSING APPARATUS

(75) Inventors: Norihisa Yamamoto, Obu (JP); Tsuneyuki Kurata, Obu (JP); Masamitsu Hayakawa, Obu (JP); Ryuji Kosugi, Obu (JP); Shinji Shimokawa, Toyota (JP); Yuusaku Nishimura, Toyota (JP); Shinsuke Kiyomiya, Toyota (JP); Masahide Kobayashi, Toyota (JP)

(73) Assignees: AISAN KOGYO KABUSHIKI KAISHA, Obu-Shi Aichi-Ken (JP); TOYOTA JIDOSHA KABUSHIKI KAISHA, Toyota-Shi, Aichi-Ken (JP)

(*) Notice: Subject to any disclaimer, the term of this patent is extended or adjusted under 35 U.S.C. 154(b) by 595 days.

(21) Appl. No.: 13/539,366

(22) Filed: Jun. 30, 2012

(65) Prior Publication Data

US 2013/0000610 A1    Jan. 3, 2013

(30) Foreign Application Priority Data

Jun. 30, 2011    (JP) ................................. 2011-145763

(51) Int. Cl.
*F02M 33/02*    (2006.01)
*F02M 25/08*    (2006.01)
*B60K 15/035*    (2006.01)

(52) U.S. Cl.
CPC ......... *F02M 25/0854* (2013.01); *F02M 25/089* (2013.01); *B60K 15/03504* (2013.01); *B60K 2015/03514* (2013.01); *F02M 25/08* (2013.01)

(58) Field of Classification Search
CPC ............ F02M 25/0836; F02M 25/089; F02M 25/0854; F02M 25/08; F02M 25/0809; F02M 25/0872; B60K 2015/03514; B60K 15/03519; B60K 15/03504
USPC ............ 123/516, 518, 519, 520, 521; 96/132, 96/133, 137
See application file for complete search history.

(56) References Cited

U.S. PATENT DOCUMENTS

| | | | | |
|---|---|---|---|---|
| 7,047,952 | B1* | 5/2006 | Yamauchi et al. | 123/519 |
| 7,097,697 | B2* | 8/2006 | Nakamura et al. | 96/134 |
| 7,134,426 | B2* | 11/2006 | Uchino et al. | 123/518 |
| 7,900,607 | B2* | 3/2011 | Lang et al. | 123/518 |

(Continued)

FOREIGN PATENT DOCUMENTS

| | | |
|---|---|---|
| JP | 05-071432 | 3/1993 |
| JP | 2002310008 A | 10/2002 |

(Continued)

OTHER PUBLICATIONS

Japanese Office Action mailed Jul. 1, 2014, corresponding to Japanese Patent Application 2011-145763; with English Translation attached.

(Continued)

*Primary Examiner* — Mahmoud Gimie
*Assistant Examiner* — Sizo Vilakazi
(74) *Attorney, Agent, or Firm* — Ladas & Parry LLP

(57) ABSTRACT

A fuel vapor processing apparatus may include a case defining therein a first adsorption chamber, a second adsorption chamber and a non-adsorption chamber communicating between the first adsorption chamber and the second adsorption chamber. The cross sectional flow area of the first adsorption chamber may be smaller than the cross sectional flow area of the second adsorption chamber.

6 Claims, 5 Drawing Sheets

(56) References Cited

U.S. PATENT DOCUMENTS

| | | | |
|---|---|---|---|
| 8,297,262 B2* | 10/2012 | Lang et al. | 123/518 |
| 8,596,250 B2* | 12/2013 | Sugiura | 123/519 |
| 2002/0020398 A1* | 2/2002 | Kimoto et al. | 123/519 |
| 2004/0206240 A1* | 10/2004 | Oh et al. | 96/135 |
| 2005/0217645 A1* | 10/2005 | Fukaya et al. | 123/519 |

FOREIGN PATENT DOCUMENTS

| | | |
|---|---|---|
| JP | 2005-195007 | 7/2005 |
| JP | 2007-146793 | 6/2007 |
| JP | 2009250059 A | 10/2009 |
| JP | 2010-101196 | 5/2010 |

OTHER PUBLICATIONS

Japanese Final Office Action mailed Sep. 24, 2014, corresponding to Japanese Patent Application 2011-145763; with English Translation attached.

* cited by examiner

FUEL VAPOR PROCESSING APPARATUS

This application claims priority to Japanese patent application serial number 2011-145763, the contents of which are incorporated herein by reference.

BACKGROUND OF THE INVENTION

1. Field of the Invention

Embodiments of the present invention relate to fuel vapor processing apparatus known as canisters that are mounted mainly to vehicles.

2. Description of the Related Art

JP-A-2005-195007 teaches a known fuel vapor processing apparatus that includes a case defining therein a gas passage. The case includes a charge port and a purge port that are disposed at one end of the gas passage for introduction of fuel vapor gas and for purging fuel vapor from the gas passage, respectively. The case further includes an atmospheric port disposed at the other end of the gas passage for introduction of air used for purging the fuel vapor. Three adsorption chambers are formed in the case along a direction of flow of gas through the gas passage. Adsorption material is filled into each of the adsorption chambers for adsorption of fuel vapor. Between each two of the three adsorption chambers positioned adjacent to each other in the direction of flow of gas through the gas passage, a spacing chamber is formed to connect between two adjacent adsorption chambers. The cross sectional flow areas of the two adjacent adsorption chambers and the spacing chamber are the same with each other.

As described above, in the known fuel vapor processing apparatus disclosed in JP-A-2005-195007, the cross sectional flow areas of two adjacent adsorption chambers and the spacing chamber are the same with each other. Therefore, the flow rate of air may not be changed during the flow of air through the two adjacent adsorption chambers. For this reason, if the flow rate of the air is high, it may be possible that fuel vapor cannot be sufficiently desorbed from the adsorption materials contained in the adsorption chambers, resulting in that the desorbing efficiency of fuel vapor may be lowered. If the fuel vapor remains in or on the adsorption materials without being desorbed, a problem may be caused that fuel vapor is blown toward the atmospheric port during filling of fuel or other occasion. Thus, the amount of fuel blown toward the atmospheric port (hereinafter called a "blow-through amount") may increase as the amount of fuel remaining in or on the adsorption materials (hereinafter called a "residual amount") increases.

Therefore, there has been a need in the art for a fuel vapor processing apparatus that can improve the fuel vapor desorption efficiency and can reduce the residual amount or the blow-through amount of fuel vapor.

SUMMARY OF THE INVENTION

In one aspect according to the present teachings, a fuel vapor processing apparatus may include a case defining therein a first adsorption chamber, a second adsorption chamber and a non-adsorption chamber communicating between the first adsorption chamber and the second adsorption chamber. The cross sectional flow area of the first adsorption chamber may be smaller than the cross sectional flow area of the second adsorption chamber.

DETAILED DESCRIPTION OF THE INVENTION

Figure 1:
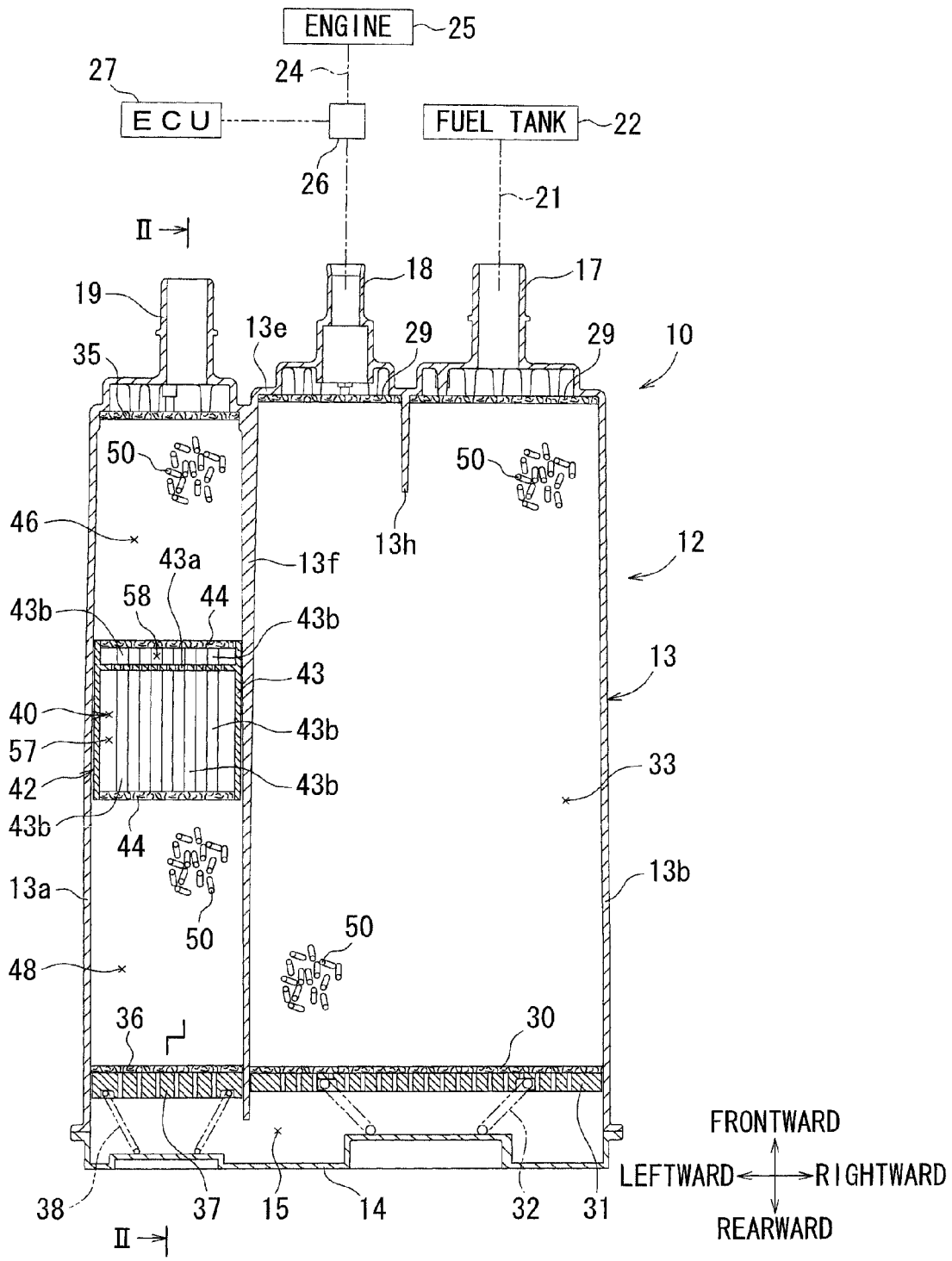
FIG. 1 is a horizontal sectional view of a fuel vapor processing apparatus according to a first embodiment.

Each of the additional features and teachings disclosed above and below may be utilized separately or in conjunction with other features and teachings to provide improved fuel vapor processing apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a fuel vapor processing apparatus may include a case defining a gas passage therein. The case may have a charge port for introduction of fuel vapor containing gas, a purge port through which fuel vapor is purged from the gas passage, and an atmospheric port for introduction of purge air. The charge port and the purge port are disposed on one side of the gas passage, and the atmospheric port is disposed on the other side of the gas passage. The gas passage includes a first absorption chamber and a second adsorption chamber positioned next to each other in a direction along a straight path. The first adsorption chamber is positioned on the side of the atmospheric port and the second adsorption chamber is positioned on the side opposite to the atmospheric port. Adsorption materials may be filled within the first and second absorption chambers. The gas passage may further include a spacing chamber communicating between the first adsorption chamber and the second adsorption chamber. The first adsorption chamber has a first cross sectional flow area, and the second adsorption chamber has a second cross sectional flow area. The first cross sectional flow area is smaller than the second cross sectional flow area. The spacing chamber may include a space extending continuously from the second adsorption chamber toward the first adsorption chamber. The space may include a first portion and a second portion communicating with the first adsorption chamber and the second adsorption chamber, respectively. At least the second portion has a third cross sectional flow area that is substantially the same as the second cross sectional flow area of the second adsorption chamber.

With this arrangement, during the purge operation, the flow rate of purge air flowing from the first adsorption chamber to the second adsorption chamber may be reduced as the purge air flows through the space of the spacing chamber. Because the purge air that has been reduced its flow rate may flow into the second adsorption chamber, the contact time of the purge air with the adsorption material contained in the second adsorption chamber may be increased. Therefore, the desorption efficiency of fuel vapor can be improved, leading to decrease in the residual amount and eventually the blow-through amount of fuel vapor.

The first portion of the space may have a fourth cross sectional flow area. The fourth cross sectional flow area may be substantially the same as the first cross sectional flow area. Alternatively, the fourth cross sectional flow area may increases stepwise or gradually in a direction from the side of the first adsorption chamber toward the second portion of the space.

With this arrangement, during the purge operation, the purge air flowing from the first adsorption chamber toward the second adsorption chamber may flow through the first portion having the fourth cross sectional flow area before flowing through the second portion. Therefore, it is possible to inhibit abrupt change of the flow rate of the purge air.

A lower wall portion of the first portion of the space may be positioned at a lower level than a lower wall portion of the first adsorption chamber. With this arrangement, because fuel vapor is heavier than the purge air, fuel vapor may be accumulated at bottoms of the second adsorption chamber and the space of the spacing chamber rather than at the bottom of the first adsorption chamber. Therefore, the blow-through amount of the fuel vapor may be reduced also in this respect.

Figure 2:
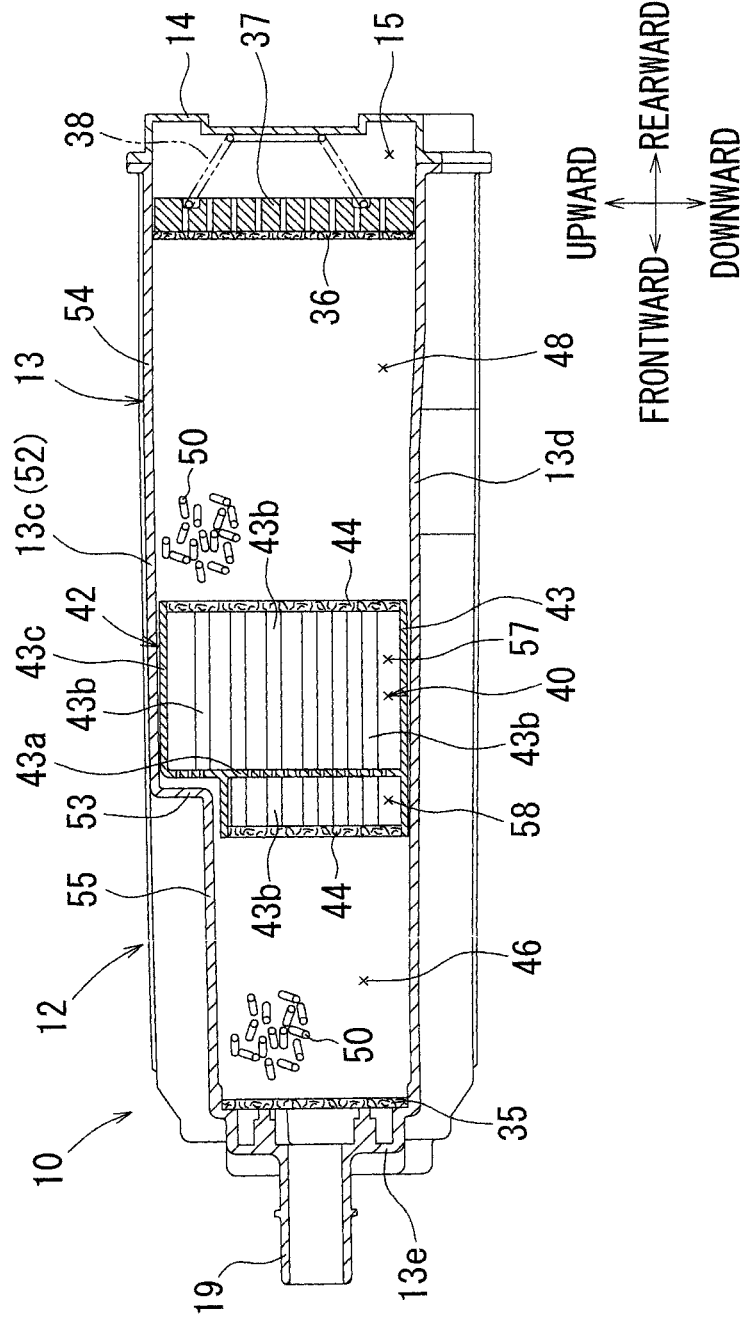
FIG. 2 is a sectional view taken along line II-II in FIG. 1.

A first embodiment will now be described with reference to FIGS. 1 to 3. Referring to FIGS. 1 and 2, there is shown a fuel vapor processing apparatus that may be called as a canister and can be installed on a vehicle, such as an automobile. For convenience of explanation, the basic structure of the fuel vapor processing apparatus will be first explained, and an explanation of details of the apparatus will follow. In addition, for the purpose of explanation, a front side, a rear side, a left side and a right side of the apparatus are determined on the basis of a horizontal sectional view of the apparatus shown in FIG. 1 as indicated in this figure. An upper side and a lower side indicated by arrows in FIG. 2 that is a sectional view taken along line II-II in FIG. 1 correspond to an upper side and a lower side of the apparatus, respectively, when the apparatus is in a state of being mounted to a vehicle (not shown).

The basic structure of the apparatus will now be described. As shown in FIG. 1, the apparatus includes a case 12 having a rectangular box shape. The case 12 may be made of resin and may include a case body 13. The case body 13 may have a rectangular parallelepiped shape and includes a left wall 13a, a right wall 13b, au upper wall 13c (see FIG. 2) and a lower wall 13d (see FIG. 2). The case body 13 also has a front wall 13e for closing the front side of the case body 13 and has a rear opening that may be closed by a closure member 14.

As shown in FIG. 1, a partition wall 13f may be formed within the case body 13 to extend parallel to the left wall 13a and the right wall 13b, so that the space within the case body 13 may be separated into left and right chambers by the partition wall 13f. The left and right chambers of the case body 13 may communicate with each other via a communication passage 15 that is formed between the case body 13 and the closure member 14. Therefore, the left and right chambers of the case body 13 and the communication passage 15 may form a substantially U-shaped path for the flow of gas.

A tank port 17 and a purge port 18 may be formed on the front wall 13e of the case body 13 in communication with the right chamber of the case body 13. An atmospheric port 19 also may be formed on the front wall 13e. However, the atmospheric port 19 is in communication with the left chamber of the case body 13. The tank port 17 may communicate with a fuel tank 22 (more specifically, a gaseous phase space (not shown) formed in the fuel tank 22) via a fuel vapor passage 21. The purge port 18 may communicate with an engine 25 (more specifically; an intake pipe at a position on the downstream side of a throttle valve (not shown)) via a purge passage 24. A purge valve 26 may be disposed in the midway of the purge passage 24. An engine control unit (ECU) 27 may control the purge valve 26 for opening and closing the same. The atmospheric port 19 may be opened to the atmosphere. The ports 17, 18 and 19 may protrude frontwardly from the front wall 13e of the case body 13. The tank port 17 may be hereinafter also called as a charge port 17. The engine 25 may be an internal combustion engine. The ECU 27 may be simply called as a controller 27.

The front end portion of the right chamber of the case body 13 may be divided into left and right side portions, i.e., a portion on the side of the purge port 18 and a portion on the side of the tank port 17, by a partition wall 13h formed on the front wall 13e and protruding into the right chamber. A perforated plate 31 may be slidably fitted within a right side part (i.e., a part on the side of the right chamber) of the rear opening of the case body 13 and may extend across substantially the entire cross sectional area of the right side part. The perforated plate 31 allows gas to flow therethrough and may be made of resin. With this arrangement, an adsorption chamber 33 may be defined within the right chamber of the case body 13.

Front filters 29 may be attached to the front wall 13e of the case body 13 at a position of the front end of the adsorption chamber 33 so as to extend across substantially the entire cross sectional area of the front end of the adsorption chamber 33, so that the front filters 29 are opposed to the tank port 17 and the purge port 18, respectively. A rear filter 30 may be attached to the front surface of the perforated plate 31 so as to be overlapped therewith. A spring 32 may be interposed between the perforated plate 31 and the surface of the closure member 14, so that the perforated plate 31 may be normally biased frontwardly by the spring 32. The spring 32 may be a coil spring.

As shown in FIGS. 1 and 2, a spacing chamber defining member 42 may be received within the left chamber of the case body 13 at a substantially intermediate position with respect to the frontward and rearward direction that is a direction along a straight path portion of a path of flow of gas thorough the apparatus 10. Therefore, the left chamber of the case body 13 is separated into a front portion and a rear portion by the spacing chamber defining member 42. The front portion of the left chamber may define an adsorption chamber 46. A perforated plate 37 may be slidably fitted within a left side part (i.e., a part on the side of the left chamber) of the rear opening of the case body 13 and may extend across substantially the entire cross sectional area of the left side part. The perforated plate 37 allows gas to flow therethrough and may be made of resin. With this arrangement, an adsorption chamber 48 may be defined within the left chamber of the case body 13 at a position on the rear side of the spacing chamber defining member 42.

For the purpose of explanation, the adsorption chamber 46, the adsorption chamber 48 and the adsorption chamber 33 may be also called as a first adsorption chamber 46, a second adsorption chamber 48 and a third adsorption chamber 33, respectively. The first adsorption chamber 46 and the second adsorption chamber 48 are positioned next to each other in the frontward and rearward direction along the straight path portion of the gas flow path. The first adsorption chamber 46 is positioned on the side of the atmospheric port 19, and the second adsorption chamber 48 is positioned on the side opposite to the atmospheric port 19.

The spacing chamber defining member 42 defines therein a spacing chamber 40 positioned between the adsorption chambers 46 and 48 for communication therebetween. The spacing chamber defining member 42 may be made of resin and may include a tubular portion 43 having a rectangular parallelepiped shape and fitted into the left chamber of the case body 13, a plate portion 43a disposed within the tubular portion 43 and separting the internal space of the tubular portion 43 into a front portion and a rear portion, and a plurality of pins 43b extending though the plate portion 43a and protruding frontwardly and rearwardly from the plate portion 43a. The plate portion 43a may be a perforated plate for allowing passage of gas. Filters 44 may be fitted into front and rear ends of the tubular portion 43 to extend across the entire cross sectional area of the tubular portion 43. The filters 44 may be held in position by the plurality of pins 43b. Alternatively, the outer circumferential edges of the filters 44 may be held or fixedly attached to the inner circumferential surface of the tubular portion 43. In such a case, the plate portion 43a and the plurality of pins 43b may be omitted.

A filter 35 may be fitted within the front end of the first adsorption chamber 46 to extend across the entire cross sectional area of the first adsorption chamber 46. A filter 36 may be attached to the perforation plate 37 so as to be overlapped therewith, no that the filter 36 may be positioned within the rear end of the second adsorption chamber 48 to extend across the entire cross sectional area of the second adsorption chamber 48. A spring 38 may be interposed between the perforated plate 37 and the surface of the closure member 14, so that the perforated plate 37 may be normally biased frontwardly by the spring 37. The spring 37 may be a coil spring.

A fuel vapor adsorption material 50 capable of adsorbing fuel vapor and allowing desorption of fuel vapor may be filled within each of the first to third adsorption chambers 46, 48 and 33. More specifically, for the first adsorption chamber 46, the fuel vapor adsorption material 50 may be filled between the filter 35 positioned at the front end of the first adsorption chamber 46 and the filter 44 positioned at the front end of the spacing chamber defining member 42. For the second adsorption chamber 48, the fuel vapor adsorption material 50 may be filled between the filter 44 positioned at the rear end of the spacing chamber defining member 42 and the filter 36 positioned at the rear end of the second adsorption chamber 48. For the third adsorption chamber 33, the fuel vapor adsorption material 50 may be filled between the filter 30 positioned at the rear end of the third adsorption chamber 33 and the filters 29 positioned at the front end of the third adsorption chamber 33. Activated carbon granules may be used as the fuel vapor adsorption material 50. The activated carbon granules may be pulverized activated carbon or may be granulated or palletized activated carbon formed from a mixture of activated carbon powder and a binder. Each of the filters 29, 30, 35, 36 and 44 may be made of non-woven resin fabric, urethane foam or any other suitable material.

A fuel vapor processing system incorporating the fuel vapor processing apparatus 10 will now be described with reference to FIG. 1. The fuel vapor processing system may include the fuel vapor processing apparatus 10, the fuel vapor passage 21, the purge valve 26 and the ECU 27.

In the state where the engine 25 of the vehicle is stopped, the purge valve 26 may be closed. Therefore, gas that may contain fuel vapor (hereinafter called "fuel vapor containing gas) produced within the fuel tank 22 may be introduced into the third adsorption chamber 33 via the fuel vapor passage 21 and the tank port 17. Then, the fuel vapor adsorption material 50 filled within the third adsorption chamber 33 may adsorb fuel vapor contained in the fuel vapor containing gas. If the fuel vapor has not been completely adsorbed by the adsorption material 50 of the third adsorption chamber 33, the remaining the fuel vapor may flow into the second adsorption chamber 48 via the communication passage 15 and may be adsorbed by the adsorption material 50 of the second adsorption chamber 48. If the remaining fuel vapor still has not been completely adsorbed by the adsorption material 50 of the second adsorption camber 48, the remaining fuel vapor may be introduced into the first adsorption chamber 46 via the spacing chamber 40 so as to be adsorbed by the adsorption material 50 filled within the first adsorption chamber 46. Therefore, the gas that contains almost only air may be discharged to the atmosphere via the atmospheric port 19.

On the other hand, during the purge operation (more specifically, during the purge control operation performed when the engine 25 is being driven), the purge valve 26 may be opened, so that a negative pressure of intake air may be applied to the gas passage of the case 12 via the purge passage 24 and the purge port 18. In association with this, the atmospheric air (fresh air) may be introduced into the first adsorption chamber 46 as a purge air via the atmospheric port 19. The purge air introduced into the first adsorption chamber 46 may desorb fuel vapor from the adsorption material 50 of the first adsorption chamber 46 and may then be introduced into the second adsorption chamber 48, so that fuel vapor may be desorbed from the adsorption material 50 of the second adsorption chamber 48. Thereafter, the purge air containing the desorbed fuel vapor may be introduced into the third adsorption chamber 33 via the communication passage 15, so that fuel vapor may be desorbed also from the adsorption material 50 of the third adsorption chamber 33. The purge air containing the desorbed fuel vapor may subsequently flow into the engine 25 via the purge port 18 and the purge passage 24, so that the fuel vapor contained in the purge air may be burned within the engine 25.

The fuel vapor processing apparatus will be further described in detail. As shown in FIG. 3 that is an enlarged view of a part of FIG. 2, a portion 52 (hereinafter called an "upper wall portion 52) of the upper wall 13c on the side of the left chamber of the case body 13 may include a stepped part 53 disposed at a position adjacent to the front side of the central portion with respect to the frontward and rearward direction of the upper wall portion 52, a rear half part 54 extending rearward from the upper end of the stepped part 53, and a front half part 55 extending frontward from the lower end of the stepped part 53. Therefore, the front half part 55 may be positioned at a level lower than the rear half part 54.

No adsorption material is filled within the spacing chamber 40. The spacing chamber 40 may include a primary space 57 and a secondary space 58. The primary space 57 extends continuously from the second adsorption chamber 48 toward the first adsorption chamber 46. The secondary space 58 extends continuously from the first adsorption chamber 46 toward the primary space 57. The rear half part 54 of the upper wall portion 52 of the upper wall 13c may define upper walls of the second adsorption chamber 46 and the primary space 57 of the spacing chamber 40. The front half part 55 of the upper wall portion 52 may define upper walls of the first adsorption chamber 46 and the secondary space 58 of the spacing chamber 40. With this arrangement, a cross sectional flow area of the primary space 57 may be the same or substantially the same as that of the second adsorption chamber 48. Here, the term "cross sectional flow area" is used to mean a cross sectional area perpendicular to the direction of flow of gas (i.e., fuel vapor and/or air). On the other hand, a cross sectional flow area of the secondary space 58 may be the same or substantially the same as that of the first adsorption chamber 46. For the purpose of explanation, a reduction in the cross sectional flow area due to the wall thickness of the spacing chamber defining member 42 is ignored. In fact, the thickness may be almost ignored by setting the wall thickness of the tubular portion 43 of the spacing chamber defining member 42 as smaller as possible. Therefore, in the following explanation, the language "the cross sectional flow area of the primary space 57" is used to mean a cross sectional flow area of the left chamber within a region where the primary space 57 is positioned. Similarly, "the cross sectional flow area of the secondary space 58" is used to mean a cross sectional flow area of the left chamber within a region where the secondary space 58 is positioned.

An upper wall portion 43c of the spacing chamber defining member 42 may be formed to have a stepped part configured to correspond to the configuration of the stepped part 53 of the upper wall portion 52. In addition, except for the front half part 55 of the upper wall portion 52, the upper wall 13c of the case body 13 may be positioned at the same level as the rear half part 54 of the upper wall portion 52. The entirety of the lower wall 13d of the case body 13 may be positioned at a uniform level or may extend within a horizontal plane. The left wall 13a and the partition wall 13f may extend parallel to each other (see FIG. 1).

Figure 3:
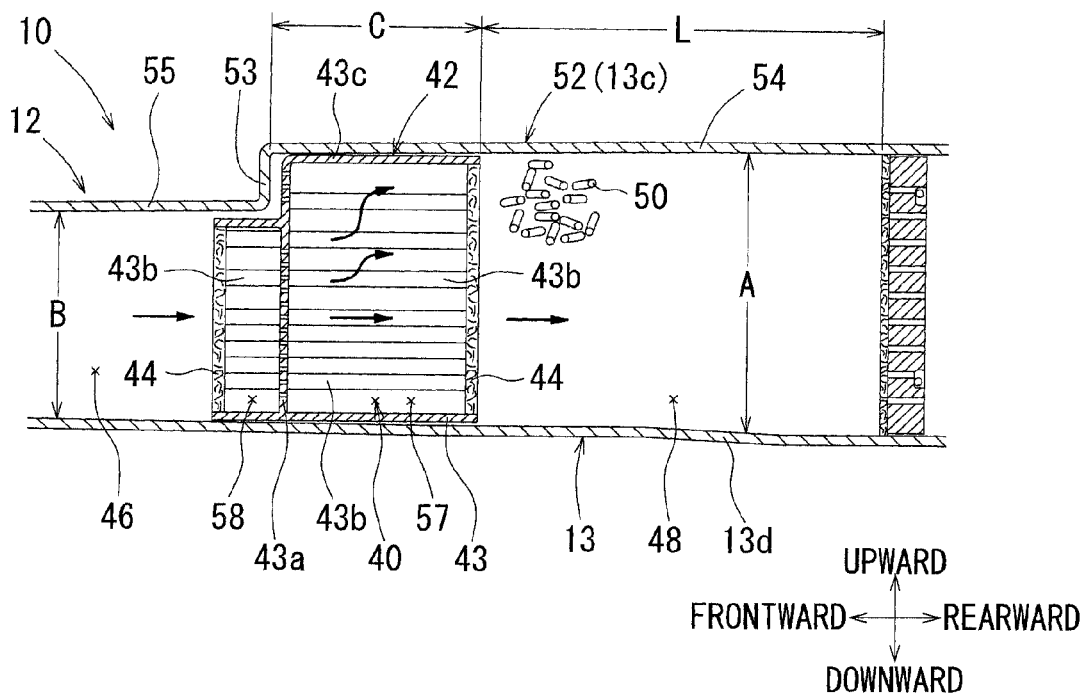
FIG. 3 is a vertical sectional view of a part of the fuel vapor processing apparatus.

In FIG. 3, reference sign "A" denotes the cross sectional flow area of the second adsorption chamber 48, and reference sign "B" denotes the cross sectional flow area of the first adsorption chamber 46. The relationship between the cross sectional flow area A and the cross sectional flow area B may be determined to satisfy the relational expression "A>1.3*B", preferably the relational expression "A=1.7*B."

In addition, in FIG. 3, reference sign "C" denotes the length of the primary space 57 of the spacing chamber 40, and reference sign "L" denotes the length of the second adsorption chamber 48. Here, the length C of the primary space 57 is that measured in the direction of flow of gas along a straight path portion defined by the primary space 57. Similarly, the length L of the second adsorption chamber 48 is that measured in the direction of flow of gas along a straight path portion defined by the second adsorption chamber 48. The relationship between the length C and the length L may be determined to satisfy the relational expression "C>(⅓)*L", preferably the relational expression "C=(⅔)*L."

With the fuel vapor processing apparatus 10 of this embodiment, for the first adsorption chamber 46 and the second adsorption chamber 48 that are positioned next to each other with respect to the direction along the straight path portion of the gas flow path, the cross sectional flow area of the first adsorption chamber 46 positioned on the side of the atmospheric port 19 is set to be smaller than that of the second adsorption chamber 48. The spacing chamber 40 communicating between the first adsorption chamber 46 and the second adsorption chamber 48 includes the primary space 57. The primary space 57 has the same or substantially the same cross sectional flow area as that of the second adsorption chamber 48 and extends continuously from the second adsorption chamber 48 toward the first adsorption chamber 46. Therefore, during the purge operation, the flow rate of the purge air flowing from the first adsorption chamber 46 into the second adsorption chamber 48 may be reduced as the purge air flows through the primary space 57 of the spacing chamber 40. Because the purge air that has been reduced in the flow rate flows through the second adsorption chamber 48, it is possible to increase the contact time of the purge air with the adsorption material 50 of the second adsorption chamber 48. Hence, it is possible to improve the desorption efficiency of fuel vapor and to reduce the residual amount and eventually the blow-through amount of the fuel vapor. Arrows in FIG. 3 indicate the flow of purge air.

Additionally, the spacing chamber 40 includes the secondary space 58 extending continuously from the first adsorption chamber 46 toward the primary space 57. The secondary space 58 has the same or substantially the same cross sectional flow area as that of the first adsorption chamber 46. During the purge operation, the purge air flowing from the first adsorption chamber 46 toward the primary space 57 flows through the secondary space 58 before it flows into the primary space 57. Therefore, it is possible to prevent abrupt change of flow rate of the purge air.

Second to sixth embodiments will now be described with reference to FIGS. 4 to 8. The second to sixth embodiments are modifications of the first embodiment. Therefore, in FIGS. 4 to 8, like members are given the same reference signs as the first embodiment and the description of these elements will not repeated.

Figure 4:
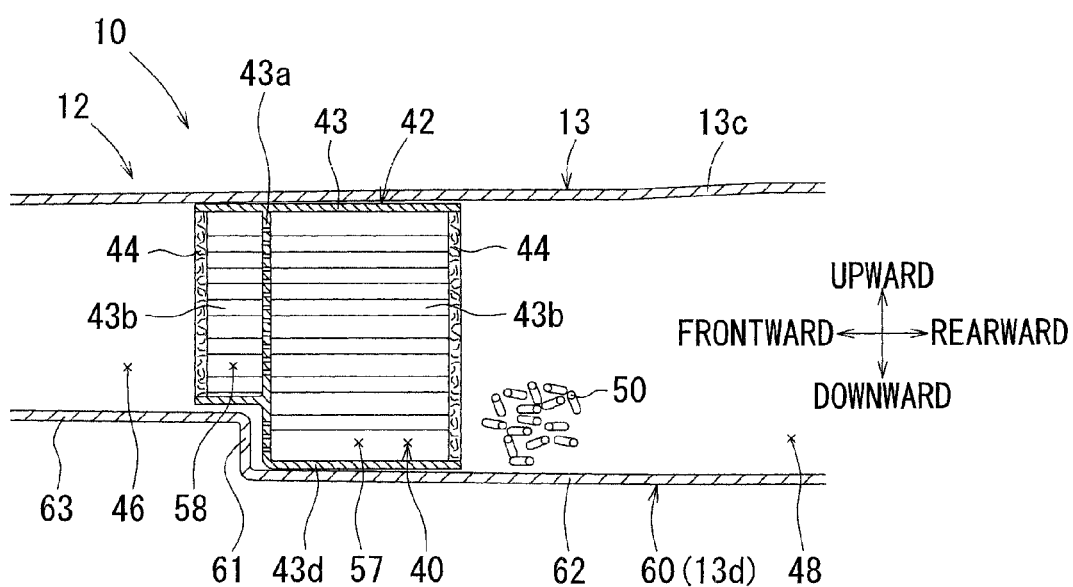
FIG. 4 is a vertical sectional view similar to FIG. 3 but showing a part of a fuel vapor processing apparatus according to a second embodiment.

A second embodiment will be described with reference to FIG. 4. As shown in FIG. 4, a portion 60 (hereinafter called a "lower wall portion 60) of the lower wall 13d on the side of the left chamber of the case body 13 may include a stepped part 61 disposed at a position adjacent to the front side of the central portion with respect to the frontward and rearward direction of the lower wall portion 60, a rear half part 62 extending rearward from the lower end of the stepped part 61, and a front half part 63 extending frontward from the upper end of the stepped part 61. Therefore, the rear half part 62 may be positioned at a level lower than the front half part 63. The rear half part 62 may define lower walls of the second adsorption chamber 46 and the primary space 57 of the spacing chamber 40. The front half part 63 may define lower walls of the first adsorption chamber 46 and the secondary space 58 of the spacing chamber 40. With this arrangement, the cross sectional flow area of the primary space 57 may be the same or substantially the same as that of the second adsorption chamber 48. On the other hand, the cross sectional flow area of the secondary space 58 may be the same or substantially the same as that of the first adsorption chamber 46.

A lower wall portion 43d of the spacing chamber defining member 42 may be formed to have a stepped part configured to correspond to the configuration of the stepped part 61 of the lower wall portion 60. In addition, except for the front half part 63 of the lower wall portion 60, the lower wall 13d of the case body 13 may be positioned at the same level as the rear half part 62 of the lower wall portion 60. The entirety of the upper wall 13d of the case body. 13 may be positioned at a uniform level or may extend horizontally.

According to the second embodiment, the rear half part 62 of the lower wall portion 60 is positioned at a lower level than the front half part 63. In addition, the lower wall of the primary space 57 of the spacing chamber 40, which is included in the rear half part 62, is positioned at a lower level than the lower walls of the first adsorption chamber 46 and the secondary space 58, which are included in the front half part 63. Therefore, within the second adsorption chamber 47 and the primary space 57 of the spacing chamber 40, fuel vapor that is heavier than air may be accumulated at a region positioned at a lower level than the lower walls of the first adsorption chamber 46 and the secondary space 58 (i.e., the front half part 63 of the lower wall portion 60). Therefore, it is possible to reduce the blow-through amount of fuel vapor also in this respect.

Figure 5:
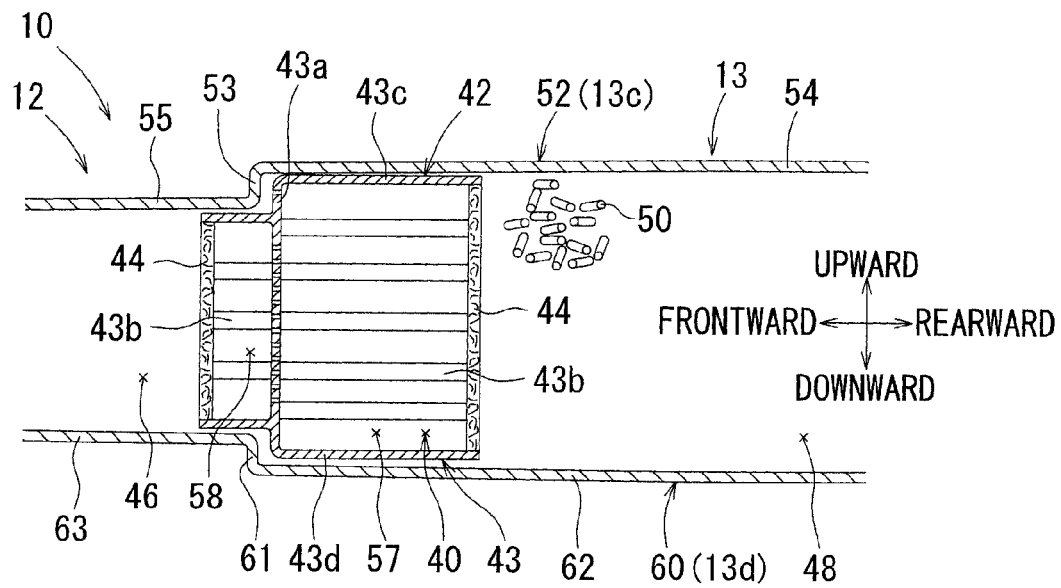
FIG. 5 is a vertical sectional view similar to FIG. 3 but showing a part of a fuel vapor processing apparatus according to a third embodiment.

A third embodiment will now be described with reference to FIG. 5. This embodiment is different from the first embodiment in that the case body 13 has the lower wall portion 60 for the left chamber of the case body 13 as provided in the second embodiment (see FIG. 4) in addition to the upper wall portion 52 for the left chamber of the case body 13 of the first embodiment. In this connection, the tubular portion 43 of the spacing chamber defining member 42 may have the upper wall portion 43c similar to that of the first embodiment and the lower wall portion 43d similar to that of the second embodiment.

Figure 6:
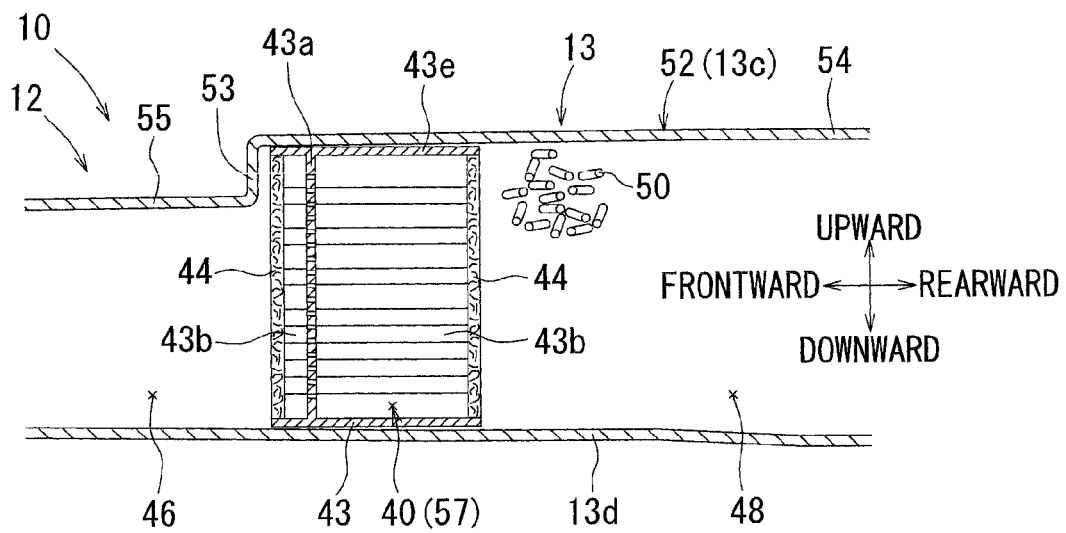
FIG. 6 is a vertical sectional view similar to FIG. 3 but showing a part of a fuel vapor processing apparatus according to a fourth embodiment.

A fourth embodiment will now be described with reference to FIG. 6. This embodiment is different from the first embodiment (see FIG. 3) in that the secondary space 58 is omitted from the spacing chamber 40, so that the spacing chamber 40 includes only the primary space 57. Therefore, the upper wall portion 43c of the tubular portion 43 of the spacing chamber defining member 42 is replaced with an upper wall portion 43e that does not have a stepped part. The front end of the upper wall portion 43e may be positioned proximal to or contact with the stepped part 53 of the upper wall portion 52 of the case body 13.

Figure 7:
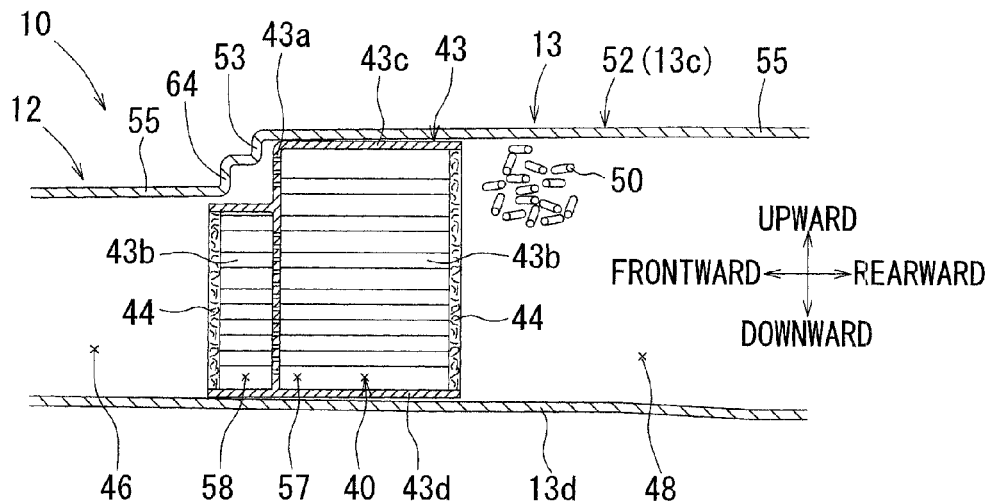
FIG. 7 is a vertical sectional view similar to FIG. 3 but showing a part of a fuel vapor processing apparatus according to a fifth embodiment.

A fifth embodiment will now be described with reference to FIG. 7. This embodiment is different from the first embodiment (see FIG. 3) in that the lower half of the stepped part 53 of the upper wall portion 52 of the case body 13 is formed with an additional stepped part 64, so that the upper wall portion 52 has two stepped parts 53 and 64. Therefore, the cross sectional flow area of the secondary space 58 may increase stepwise in a direction from the side of the first adsorption chamber 46 toward the side of the primary space 57. Therefore, it is possible to decrease the flow rate of the purge air in a stepwise fashion within the secondary space 58. In addition, the upper end of the plate portion 43a that is a perforated plate may form a part of the upper wall portion 43c of the tubular portion 43 of the spacing chamber defining member 42, which is opposed to the stepped parts 53 and 64. Therefore, it is possible to ensure that purge air can smoothly flow into the primary space 57. The number of the additional stepped part 53 may not be limited to one but may be two or more.

Figure 8:
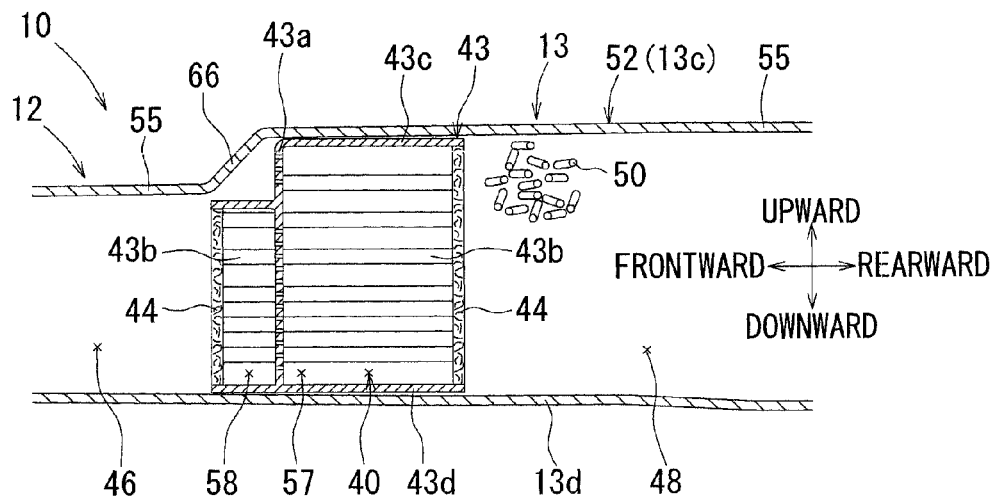
FIG. 8 is a vertical sectional view similar to FIG. 3 but showing a part of a fuel vapor processing apparatus according to a sixth embodiment.

A sixth embodiment will now be described with reference to FIG. 8. In this embodiment, the upper wall portion 52 of the case body 23 has an inclined wall part 66 in place of the stepped part 53 of the first embodiment (FIG. 3). The inclined wall part 66 may be inclined upward toward the rear side or inclined downward toward the front side. In this connection, the cross sectional flow area of the secondary space 58 may increase gradually in a direction from the side of the first adsorption chamber 46 toward the side of the primary space 57. Therefore, it is possible to gradually decrease the flow rate of the purge air within the secondary space 58. In addition, the upper end of the plate portion 43a that is a perforated plate may form a part of the upper wall portion 43c of the tubular portion 43 of the spacing chamber defining member 42, which is opposed to the inclined wall part 66. Therefore, it is possible to ensure that purge air can smoothly flow into the primary space 57.

The above embodiments may be modified in various ways. For example, although the fuel vapor processing apparatus 10 of the above embodiments include three absorption chambers arranged in the direction of the gas flow path, the fuel vapor processing apparatus 10 may include only two absorption chambers 46 and 47 that are positioned next to each other along the straight path portion or may include four or more adsorption chambers including the adsorption chambers 46 and 47. In addition, the fuel vapor processing apparatus 10 may be mounted to a vehicle in various positions and orientations other than those disclosed above. Further, although the distance or height between the upper wall portion and the lower wall portion of the secondary space 58 is reduced in order to reduce the cross sectional flow area of the secondary space 58 than that of the primary space 57, it may be possible to reduce the width between the left wall and the right wall of the secondary space 58. Furthermore, although the spacing chamber defining member 42 having front and rear filters 44 was used for holding the adsorption materials 50 within the adsorption chambers 46 and 48, the adsorption materials 50 may be held within the adsorption chambers 46 and 48 by any other suitable means. In addition, the structure, the shape and the arrangement of the spacing chamber defining member 42 may be suitably changed.

What is claimed is:

1. A fuel vapor processing apparatus comprising:
   a case defining a gas passage therein and having a charge port for introduction of fuel vapor containing gas, a purge port through which fuel vapor is purged from the gas passage, and an atmospheric port for introduction of purge air; wherein:
   the charge port and the purge port are disposed on one side of the gas passage, and the atmospheric port is disposed on the other side of the gas passage;
   the gas passage includes a first absorption chamber and a second adsorption chamber positioned next to each other in a direction along a straight path, the first adsorption chamber being positioned on the side of the atmospheric port and the second adsorption chamber being positioned on the side opposite to the atmospheric port;
   adsorption materials are filled within the first and second absorption chambers;
   the gas passage further includes a spacing chamber communicating between the first adsorption chamber and the second adsorption chamber;
   the first adsorption chamber has a first cross sectional flow area, and the second adsorption chamber has a second cross sectional flow area, the first cross sectional flow area being smaller than the second cross sectional flow area;
   the spacing chamber includes a space extending continuously from the second adsorption chamber toward the first adsorption chamber,
   the space includes a first portion and a second portion communicating with the first adsorption chamber and the second adsorption chamber, respectively;
   the second portion has a third cross sectional flow area that is substantially the same as the second cross sectional flow area;
   the cross sectional flow area of the first portion of the space increases stepwise in the direction from the side of the first adsorption chamber toward the second portion of the space; and
   the cross sectional flow area of a part of the first portion proximal to the first adsorption chamber is substantially the same as the first cross sectional flow area of the first adsorption chamber.

2. The fuel vapor processing apparatus as in claim 1, wherein a lower wall portion of the second portion of the space is positioned at a lower level than a lower wall portion of the first adsorption chamber.

3. The fuel vapor processing apparatus as in claim 1, further comprising a space defining member that defines at least a part of the space therein and is received within the case.

4. The fuel vapor processing apparatus as in claim 3, wherein the space defining member is a separate member from the case.

5. A fuel vapor processing apparatus comprising:
a case defining a gas passage therein and having a charge port for introduction of fuel vapor containing gas, a purge port through which fuel vapor is purged from the gas passage, and an atmospheric port for introduction of purge air; wherein:
the charge port and the purge port are disposed on one side of the gas passage, and the atmospheric port is disposed on the other side of the gas passage;
the gas passage includes a first absorption chamber and a second adsorption chamber positioned next to each other in a direction along a straight path, the first adsorption chamber being positioned on the side of the atmospheric port and the second adsorption chamber being positioned on the side opposite to the atmospheric port;
adsorption materials are filled within the first and second absorption chambers;
the gas passage further includes a spacing chamber communicating between the first adsorption chamber and the second adsorption chamber;
the first adsorption chamber has a first cross sectional flow area, and the second adsorption chamber has a second cross sectional flow area, the first cross sectional flow area being smaller than the second cross sectional flow area; and
the spacing chamber includes a space extending continuously from the second adsorption chamber toward the first adsorption chamber,
the space includes a first portion and a second portion communicating with the first adsorption chamber and the second adsorption chamber, respectively;
at least the second portion has a third cross sectional flow area that is substantially the same as the second cross sectional flow area;
the space is defined by a space defining member;
the space defining member comprising:
a tubular portion fitted within the case and having a first open end on the side of the first adsorption chamber and a second open end on the side of the second adsorption chamber;
a plate portion separating an internal space of the tubular portion into a first space portion on the side of the first adsorption chamber and a second space portion on the side of the second adsorption chamber, the plate portion being a perforated plate for allowing passage of gas;
a first filter attached to the first open end of the tubular portion so as to extend across the first open end; and
a second filter attached to the second open end of the tubular portion so as to extend across the second end.

6. The fuel vapor processing apparatus as in claim 5, wherein:
the plate portion includes a first surface on the side of the first space portion of the tubular portion and a second surface on the side of the second space portion of the tubular portion;
the fuel vapor processing apparatus further comprises:
a plurality of first pins extending from the first surface of the plate portion toward the first open end of the tubular portion through the first space portion and configured to support the first filter; and
a plurality of second pins extending from the second surface of the plate portion toward the second open end of the tubular portion through the second space portion and configured to support the second filter.

* * * * *